(12) United States Patent
Kim et al.

(10) Patent No.: US 7,072,042 B2
(45) Date of Patent: Jul. 4, 2006

(54) APPARATUS FOR AND METHOD OF MEASUREMENT OF ASPHERIC SURFACES USING HOLOGRAM AND CONCAVE SURFACE

(75) Inventors: Tae-hee Kim, Gyeonggi-do (KR); James H. Burge, Tucson, AZ (US)

(73) Assignee: Samsung Electronics Co., LTD, Suwon-si (KR)

( * ) Notice: Subject to any disclaimer, the term of this patent is extended or adjusted under 35 U.S.C. 154(b) by 486 days.

(21) Appl. No.: 10/324,117

(22) Filed: Dec. 20, 2002

(65) Prior Publication Data

US 2003/0184762 A1 Oct. 2, 2003

(Under 37 CFR 1.47)

(30) Foreign Application Priority Data

Dec. 21, 2001 (KR) ........................................ 2001-82483

(51) Int. Cl.
*G01B 9/02* (2006.01)

(52) U.S. Cl. ........................................ 356/458; 356/513
(58) Field of Classification Search ................ 356/457, 356/458, 511, 512, 513, 514
See application file for complete search history.

(56) References Cited

U.S. PATENT DOCUMENTS

| | | | | | |
|---|---|---|---|---|---|
| 4,396,289 A | * | 8/1983 | Fantone | ...................... | 356/458 |
| 4,696,572 A | * | 9/1987 | Ono | ........................... | 356/458 |
| 4,812,042 A | * | 3/1989 | Yokokura et al. | ........... | 356/458 |
| 5,039,223 A | * | 8/1991 | Gemma et al. | ............. | 356/458 |
| 5,530,547 A | | 6/1996 | Arnold | | |
| 5,737,079 A | * | 4/1998 | Burge et al. | ................. | 356/513 |
| 6,714,308 B1 | * | 3/2004 | Evans et al. | ................. | 356/513 |
| 6,781,700 B1 | * | 8/2004 | Kuchel | ........................ | 356/513 |

OTHER PUBLICATIONS

Kobayashi, Kosei JP 363223538A, Mar. 13, 1987.*
Zygo® GPI XP™ and GPI XPHR™ Specifications.
Zygo® product description.
Zygo® Transmission Sphere Selection.

* cited by examiner

*Primary Examiner*—Gregory J. Toatley, Jr.
*Assistant Examiner*—Patrick Connolly
(74) *Attorney, Agent, or Firm*—Staas & Halsey LLP

(57) ABSTRACT

An aspheric surface measuring apparatus includes an interferometer which generates incident light; a test piece having an aspheric surface from which the incident light is reflected as test light; a first optical element disposed on an optical path of the incident light, having at least one surface with a hologram for diffracting the incident light toward the test piece; and a second optical element disposed after the first optical element, which transmits the incident light toward the aspheric surface and has a concave surface to reduce an incident angle of the test light entering the hologram after having been reflected from the aspheric surface. Alternatively, a single optical element with a hologram and a concave surface can be used instead of the separate first and second optical elements. An extremely aspheric lens can be precisely measured using the apparatus.

41 Claims, 13 Drawing Sheets

APPARATUS FOR AND METHOD OF MEASUREMENT OF ASPHERIC SURFACES USING HOLOGRAM AND CONCAVE SURFACE

CROSS-REFERENCE TO RELATED APPLICATION

This application claims the benefit of Korean Application No. 2001-82483 filed Dec. 21, 2001 in the Korean Intellectual Property Office, the disclosure of which is incorporated herein by reference.

BACKGROUND OF THE INVENTION

1. Field of the Invention

The present invention relates to an apparatus and method of measuring aspheric surfaces, and more particularly, to an apparatus and method of measuring aspheric surfaces using a hologram.

2. Description of the Related Art

Aspheric lenses are widely used in a variety of products, including large-scale projection display systems and camcorders. The trend toward light-weight, small, and high-picture quality apparatuses has gradually increased the diameter and asphericity of the aspheric lens. The manufacture of the aspheric lens needs high precision and accuracy in shaping the aspheric lens. Accordingly, an apparatus and method to measure the shape of the aspheric lens with high precision using a hologram and interferometer have been developed.

Apparatuses and methods for measuring an aspheric lens using a computer-generated hologram (CGH) were disclosed in U.S. Pat. Nos. 5,737,079 and 5,530,547. The CGH refers to a hologram written by calculating a complex amplitude distribution from a phase distribution of light for an object.

FIG. 1 shows an aspheric surface measuring apparatus disclosed in U.S. Pat. No. 5,737,079. The apparatus includes a light source 1, a beam splitter 2 which alters an optical path, a test plate member 3 having a reference surface 4 on which a CGH 5 for generating reference light WR is written, a test lens 6 having an aspheric surface 7, and an imaging plane 10 on which are formed interference images of the test light WT reflected from the aspheric surface 7 and of the reference light WR. Here, the CGH is written on the reference surface 4 as chrome-on-glass. An aperture plane 8 having an aperture 8a, and a lens 9 are also used to focus on the imaging plane 10.

Light L1 is emitted from the light source 1 and diverges through the beam splitter 2 as light L2. The light L2 proceeds toward the test plate member 3 and the test lens 6. The light L2 is transmitted through the test plate member 3, enters perpendicular to the spherical surface 7 as light L3, and is reflected back along the same optical path as the test light WT. The reference light WR corresponds to the light L2 diffracted at the CGH 5 written on the reference surface 4 of the test plate member 3.

The aspheric surface measuring apparatus has a Fizeau interferometer configuration such that the test plate member 3 is aligned with the other optics to provide a common path for the reference light WR and the test light WT. The apparatus measures the aspheric surface 7 by reading an error in the aspheric surface 7 from a deviation of interference fringes on the imaging plane 10 with respect to a null interference fringe. Null interference fringes show that no interference fringe is formed.

In the aspheric surface measuring apparatus, the test plate member 3 with the CGH 5 needs a high degree of surface precision to reflect the incident light as the reference light WR and the test light WT. Especially, when the test plate member 3 is positioned before the test lens 6, the surface precision of the test plate member 3 is highly important to pass the incident light through the test plate member 3 as the test light WT. However, it is difficult to manufacture the test plate member 3 with such a high degree of surface precision. Another reason for the need of the high-precision test plate member 3 lies in that the test plate member 3 generates the reference light WR.

In the aspheric surface measuring apparatus, the CGH 5 of the test plate member 3 is formed as chrome-on-glass to transmit light. A transparent phase type CGH cannot be used for the CGH 5. Similar to aluminum, chromium provides an opaque silver-like coating. The CGH 5 includes an opaque portion of chromium and a transparent portion of glass. The chrome-on-glass type CGH 5 transmits and reflects the incident light as the test light WT and the reference light WR, respectively. Since the transparent phase type CGH fully transmits the incident light, the reference light WR and test light WT cannot be generated with the transparent type CGH. Accordingly, there is a need to coat the rear of the CGH with aluminum to reflect a portion of the incident light as the test light WT.

When the optical paths of the reference light WR and the test light WT are not common in such an aspheric surface measuring apparatus, measurement errors occur due to environmental factors, such as external vibration. For this reason, the Fizeau interferometer, where the reference light WR and test light WT travel along a common optical path, has been used in the aspheric surface measuring apparatus to minimize the measurement errors.

FIG. 2 shows another conventional CGH aligning and aspheric surface testing apparatus disclosed in U.S. Pat No. 5,530,547. Referring to FIG. 2, an optical mount 17 having a base 11 and a mount plate 13, which is detachably fixed to the base 11, and a frame 15 in which an optical element (not shown) such as a CGH or a CGH null compensator is mounted. The frame 15 and the optical mount 17 are arranged parallel to one another. The frame 15 is releasably coupled to the mount plate 13.

In the CGH aligning apparatus, a spherical test beam is generated by an interference system to create interference fringes after being diffracted by the CGH. The mount plate 13 is adjusted relative to the base 11 to diffract the test beam onto itself, thus producing null interference fringes. The base 11 has screws for adjusting the frame 15 coupled to the mount plate 13. The CGH mounted on the frame 15 is adjusted by the screws until null interference fringes are produced. After the null interference fringes are created, the CGH is removed from the frame 15, and the CGH null compensator is mounted in order to test an aspheric lens.

In the aspheric surface testing apparatus of FIG. 2, since the base 11 and the base plate 13 are manually aligned, it is highly likely that there will be mechanical adjustment errors. Therefore, an aspheric lens having an extreme asphericity cannot be accurately tested with the apparatus. Furthermore, the conventional aspheric surface testing apparatuses cannot be applied to test an extremely aspheric lens with precision due to the limitations of CGH grating spaces.

SUMMARY OF THE INVENTION

Accordingly, it is an aspect of the present invention to provide an apparatus for and method of measuring aspheric surfaces with precision, especially for an extremely aspheric optical element, in which the optical system is simply constructed by an interferometer, optical elements which do not require high surface precision, and a holograph with a large grating space.

Additional aspects and advantages of the invention will be set forth in part in the description which follows and, in part, will be obvious from the description, or may be learned by practice of the invention.

In one aspect, the present invention provides an apparatus for measuring aspheric surfaces, comprising an interferometer which generates incident light, a test piece having an aspheric surface from which the incident light is reflected as test light, a first optical element disposed on an optical path of the incident light and having at least one surface with a hologram for diffracting the incident light toward the test piece, and a second optical element disposed after the first optical element, which transmits the incident light toward the aspheric surface and has a concave surface to reduce an incident angle of the test light entering the hologram after having been reflected from the aspheric surface.

According to another aspect, the first optical element further comprises a concave surface and that the second optical element further comprises a surface with a hologram.

In a further aspect of the apparatus, the incident light is reflected as the test light after having entered perpendicular to the aspheric surface of the test piece, and the test light proceeds along a same optical path as an optical path of the incident light.

According to an additional aspect, the apparatus further comprises a spherical mirror after the test piece.

According to a yet additional aspect, the hologram is a computer-generated hologram (CGH).

In another aspect, the present invention provides a method of measuring aspheric surfaces, comprising splitting light emitted from a light source into incident light and reference light using an optical path changer, passing the incident light to a first optical element with a hologram to diffract the incident light using the hologram, transmitting the diffracted incident light through a second optical element having a concave surface, reflecting from a test piece the incident light after having passed through the concave surface and being incident on the test piece with an aspheric surface to generate test light, and measuring an error in the aspheric surface from interference fringes of the test light and the reference light.

According to still another aspect, in the reflecting the incident light, the incident light is incident perpendicular to the aspheric surface of the test piece, and the test light reflected from the aspheric surface proceeds along a same optical path along which the incident light proceeds.

According to yet another aspect, in the reflecting the incident light, the incident light is transmitted through the test piece, is incident perpendicular to a spherical mirror disposed after the test piece, and is reflected from the spherical mirror as the test light, and the test light reflected from the spherical mirror proceeds along a same optical path along which the incident light proceeds.

According to yet still another aspect, in the reflecting the incident light, the error in the aspheric surface is measured from a deviation of the interference fringes of the test light and the reference light with respect to a null interference fringe.

According to a further aspect, the hologram is a computer-generated hologram (CGH).

According to an aspect of the method according to the present invention, when the test piece has a convex aspheric surface, an error in the convex aspheric surface is calculated using the following equation:

$$S_2 = \frac{1}{2(n-1)}(2S_1(n-1) - TRW)$$

where $S_1$ denotes an error in the concave surface of the second optical element, $S_2$ denotes the error in the convex aspheric surface of the test piece, n is a refractive index of the test piece, and TRW denotes a transmission wavefront.

According to still another aspect, the present invention provides an apparatus for measuring aspheric surfaces, comprising an interferometer which generates incident light, a test piece having an aspheric surface from which the incident light is reflected as test light, an optical element disposed on an optical path between the incident light and the test piece, the optical element having a hologram to diffract the incident light toward the test piece, and a concave surface to reduce an incident angle of the incident light incident on the hologram, where the incident light is reflected as test light after having been incident perpendicular to the aspheric surface of the test piece, and the test light proceeds along a same optical path along which the incident light proceeds.

According to an additional aspect of the present invention, the incident light is generated by using a Fizeau interferometer or a Twymann-Green Interferometer, and only the test light is incident on optical elements used to measure the aspheric surface such that the optical elements do not require a high degree of precision.

According to a still additional aspect, an optical element with a concave surface is arranged after the optical element with the hologram, or the optical element includes the hologram and the concave surface together in its body is arranged such that the concave surface faces the test piece such that an incident angle of the incident light incident on the hologram is reduced, and a grating space of the hologram is increased, whereby an extremely aspheric test piece can be precisely measured with the apparatus according to the present invention.

BRIEF DESCRIPTION OF THE DRAWINGS

The above and for other aspects and advantages of the present invention will become more apparent by describing in detail exemplary embodiments thereof with reference to the accompanying drawings in which.

DETAILED DESCRIPTION OF THE EMBODIMENTS

Figure 1:
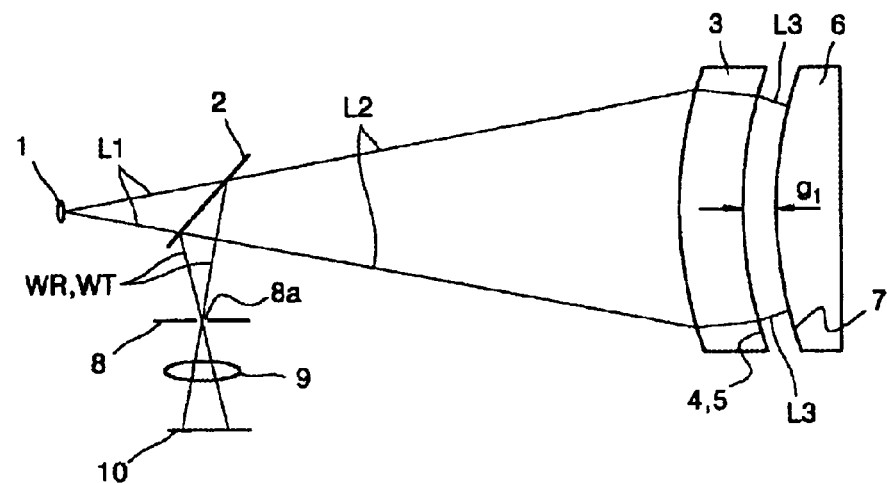
FIG. 1 shows a conventional aspheric surface measuring apparatus.
Figure 2:
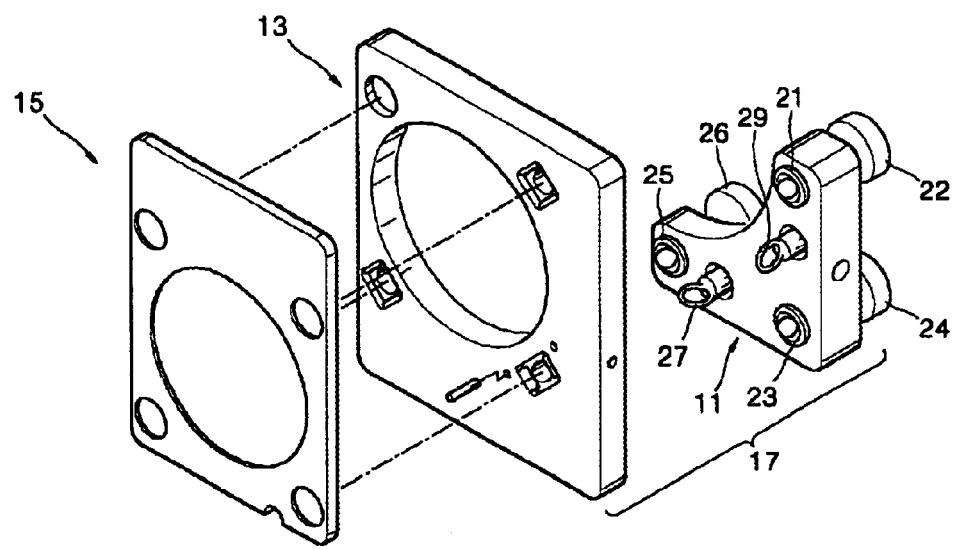
FIG. 2 shows another conventional aspheric surface measuring apparatus.

Embodiments of the invention will be described in detail with reference to the accompanying drawings, wherein like reference numerals refer to the like elements throughout. The embodiments are described below in order to explain the present invention by referring to the figures. In the drawings, the size and thickness of elements are exaggerated for clarity.

Figure 3A:
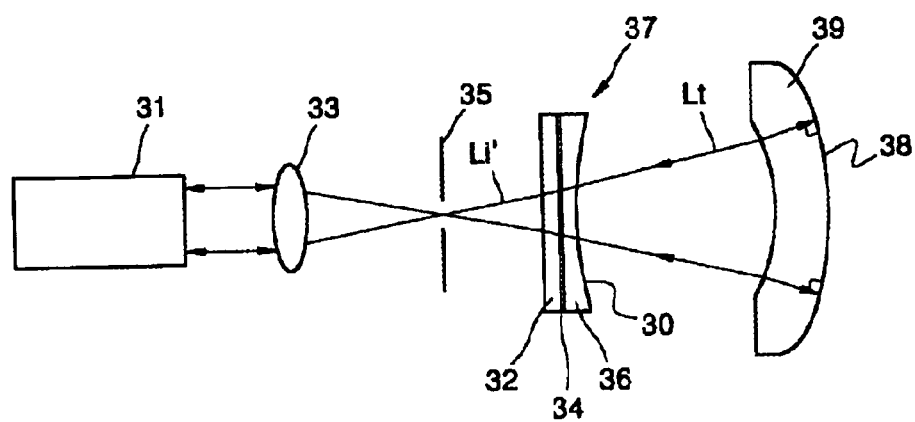
FIG. 3A shows an embodiment of an aspheric surface measuring apparatus according to the present invention.
Figure 3B:
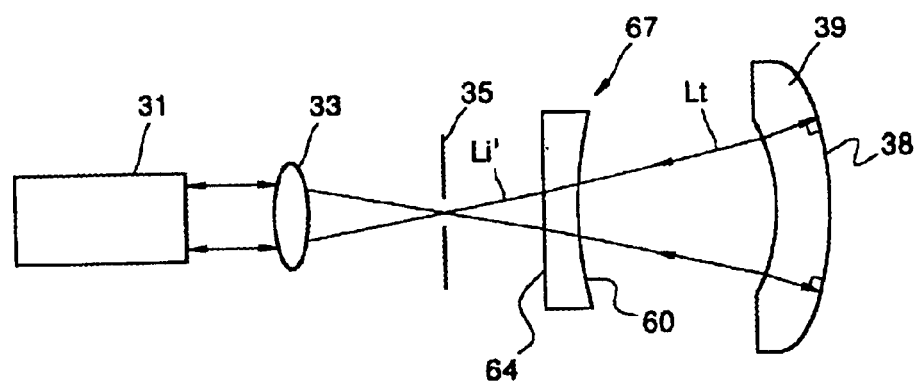
FIG. 3B shows another embodiment of the aspheric surface measuring apparatus according to the present invention.

FIGS. 3A and 3B show embodiments of the apparatus for measuring aspheric surfaces according to the present invention. Referring to FIG. 3A, the aspheric surface measuring apparatus includes an interferometer 31, a condensing lens 33 which condenses light emitted from the interferometer 31, and a spatial filter 35 which spatially modulates the frequency of the condensed light. A first optical member 37 having a hologram 34 and a concave surface 30 diffracts and diverges, respectively, incident light Li' from the spatial filter 35. A test piece 39 having an aspheric surface 38 to be measured receives light from the first optical member 37 and reflects the light towards the first optical member 37 as test light Lt. While not required in all aspects of the invention, the hologram 34 is a computer-generated hologram (CGH). The spatial filter 35 is used so as to block unnecessary orders of diffracted beams.

Referring to the embodiment shown in FIG. 3B, the interferometer 31, the condensing lens 33, the spatial filter 35, and the test piece 39 are the same as in the first embodiment of FIG. 3A. However, a second optical member 67 has a hologram 64 and a concave surface 60 on sides of a common body. Accordingly, unlike the first optical member 37, the second optical member 67 is a single optical element with no air gap between the concave surface 60 and the hologram 64.

In the aspheric surface measuring apparatuses of FIGS. 3A and 3B, the incident light Li' is emitted from the interferometer 31. The incident light Li' is condensed by the condensing lens 33 to proceed toward the spatial filter 35. The incident light Li' proceeds from the spatial filter 35 towards the first and second optical members 37 and 67 which have the respective holograms 34 and 64 and the respective concave surfaces 30 and 60, and proceeds toward the test piece 39. The light Li' enters perpendicular (i.e., normal) to the aspheric surface 38 of the test piece 39 and is reflected to become the test light Lt. The optical path of the light Li' incident to the aspheric surface 38 and the optical path of the test light Lt reflected from the aspheric surface 38 are the same.

Figure 4A:
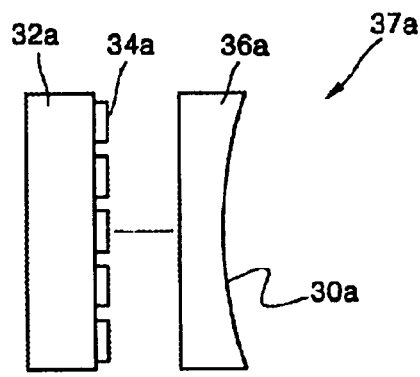
FIGS. 4A through 4C shows embodiments of an optical member for an aspheric surface measuring apparatus according to the present invention.
Figure 4B:
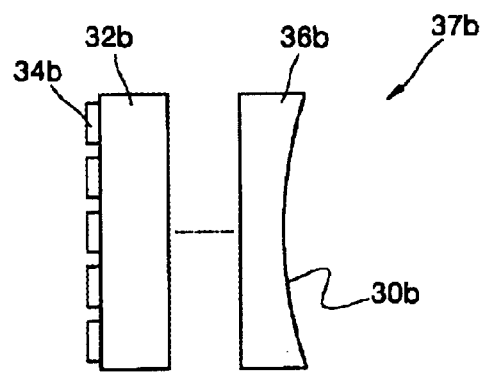
Figure 4C:
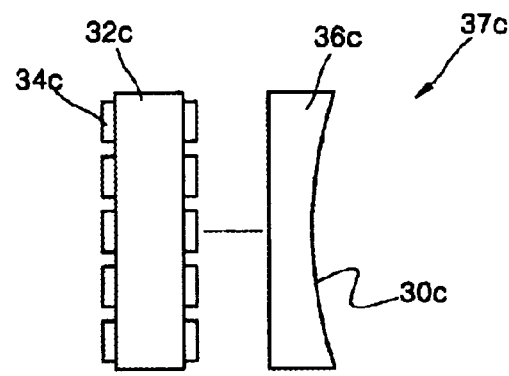

Embodiments of the first optical member 37 are shown in FIGS. 4A through 4C. Referring to FIGS. 4A through 4C, the first optical members 37a, 37b, and 37c include respective first optical elements 32a, 32b, 32c and respective second optical elements 36a, 36b, and 36c. Each of the first optical elements 32a, 32b, and 32c has at least one corresponding hologram 34a, 34b, and 34c, respectively. Each of the second optical elements 36a, 36b, and 36c has a corresponding concave surface 30a, 30b, and 30c, respectively, through which the incident light Li' is emitted.

The three types of the first optical members illustrated in FIGS. 4A through 4C are distinguished from one another in that the holograms 34a, 34b, and 34c are formed on different surfaces. A suitable optical member 37 is selected in consideration of the asphericity of the test piece 39 and the incident angle of the incident light Li'. The first optical element 32a, 32b, or 32c and second optical element 36a, 36b, or 36c are appropriately spaced to precisely test the aspheric surface 38 of the test piece 39.

Figure 5:
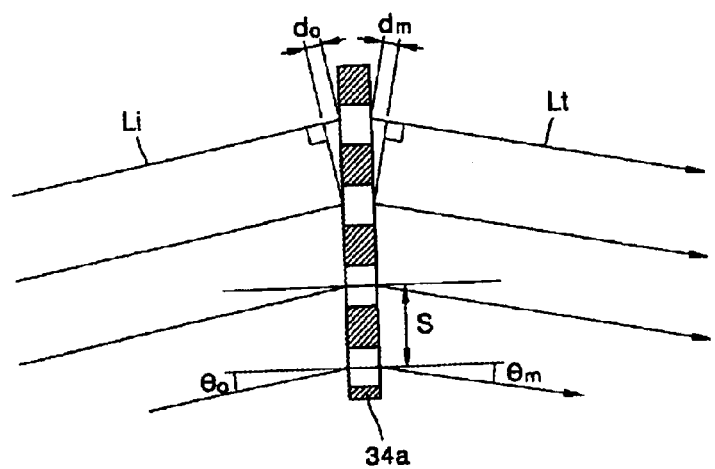
FIG. 5 illustrates the relationship between the grating space of a computer-generated hologram (CGH) and an incident angle of light entering the CGH.

FIG. 5 illustrates the concept of a CGH acting as a 1-dimensional diffraction grating. A grating space of the hologram 34a having a general 1-dimensional diffraction grating is expressed as equation 2 below:

$$S(\sin\theta_0 + \sin\theta_m) = d_0 + d_m = m\lambda \quad (2)$$

where S indicates the grating space, $\theta_0$ indicates an incident angle of light entering the grating, $\theta_m$ indicates a diffraction angle of the incident light diffracted by the grating, and m=0, ±1, ±2, . . . As is apparent from equation 2 above, the grating space S of the hologram 34a is dependent on the incident angle $\theta_0$ and the diffraction angle $\theta_m$ when the wavelength $\lambda$ of the incident light is constant. The greater the incident angle $\theta_0$, the smaller the grating space S.

When the grating space S is smaller, it is more difficult to manufacture the hologram 34. Therefore, there is a need to reduce an incident angle of the test light Lt entering the hologram 34 so as to manufacture the hologram 34 having a large grating space. To this end, a lens 36 with a concave surface is arranged after the first optical element 32 which has the hologram 34, as shown in FIGS. 3A and 3B, to reduce the incident angle of the test light Lt and to write the hologram 34.

In the embodiment of the aspheric surface measuring apparatus according to the present invention, the second optical element 36 having the concave surface 30 facing the test piece 39 is disposed after the first optical element 32 on which the hologram 34 is written. As such, the incident angle of the test light Lt entering the hologram 34 after being reflected from the aspheric surface 38 is reduced.

When a phase type CGH was practically manufactured using a laser beam, without using a concave lens, the minimum grating space was 1 μm. However, when the concave lens was applied to manufacture the CGH, the minimum grating space of the CGH was increased to 3 µm. When a CGH is manufactured using a laser writing machine, the grating space is limited to 3 µm.

Figure 6A:
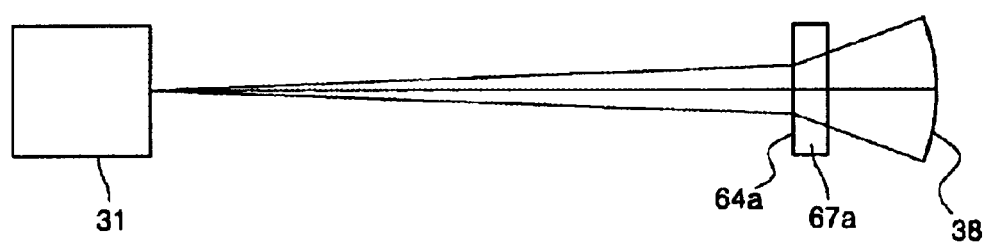
FIGS. 6A through 6G show simulations of optical members having concave surfaces to reduce the grating space of the CGH.

FIGS. 6A through 6G show simulations of optical members having concave surfaces to reduce the grating space of the CGH when used in the aspheric surface measuring apparatus according to the present invention. As shown in FIG. 6A, when a CGH 64a is written on a surface of a flat lens 67a for use in an aspheric surface measuring apparatus, which faces the interferometer 31, the CGH 64a has a minimum grating space of 2 microns.

Figure 6B:
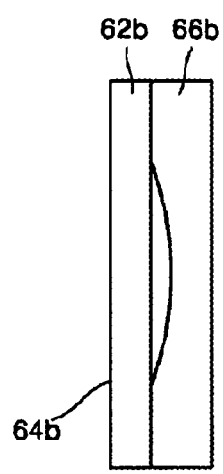

Referring to FIG. 6B, a flat first optical element 62b and a second optical element 66b are arranged. The second optical element 66b is flat toward the aspheric surface 38 to be measured and is concave toward the first optical element 62b. In this state, when a CGH 64b is written on the surface of the first optical element 62b facing the interferometer 31, the minimum grating space of the CGH 64b is slightly increased to about 2.9 microns.

Figure 6C:
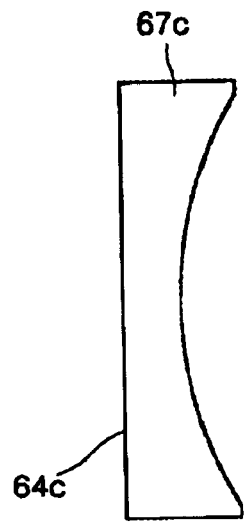

As shown in FIG. 6C, an optical element 67c includes a flat surface facing the interferometer 31 and a concave surface facing the aspheric surface 38. When a CGH 64c is written on the flat surface of the optical element 64c, the minimum grating space of the CGH 64c is increased to about 3.7 microns.

Figure 6D:
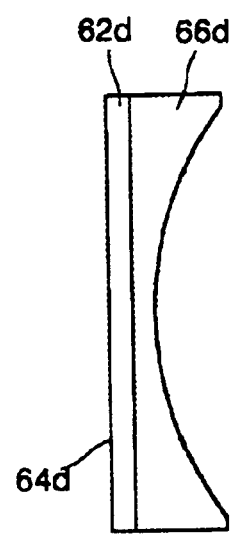

As shown in FIG. 6D, a second optical element 66d includes a concave surface and is arranged on the rear surface of a flat first optical element 62d such that the concave surface faces the aspheric surface 38. When a CGH 64d is written on the front surface of the first optical element 62d facing the interferometer 31, the minimum grating space of the CGH 64d is about 3.7 microns, which is the same as that of the structure disclosed in FIG. 6C.

Figure 6E:
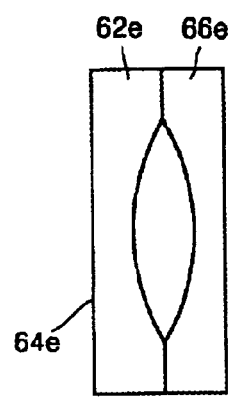

Alternatively, as shown in FIG. 6E, a first optical element 62e has a flat surface toward the interferometer 31 and a concave surface in the opposite direction, and a second optical element 66e has a concave surface facing the first optical element 62e and a flat surface facing the aspheric surface 38. When a CGH 64e is written on the flat surface of the first optical element 62e facing the interferometer 31, the minimum grating space of the CGH 62e is increased to about 5 microns.

Figure 6F:
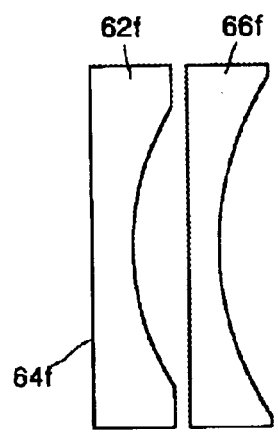

Referring to FIG. 6F, a first optical element 62f has a flat surface facing the interferometer 31 and a concave surface in the opposite direction, and a second optical element 66f includes a flat surface facing the first optical element 62f and a concave surface facing the aspheric surface 38. When a CGH 64f is written on the flat surface of the first optical element 62f facing the interferometer 31, the minimum grating space of the CGH 64f is increased to about 6.5 microns.

Figure 6G:
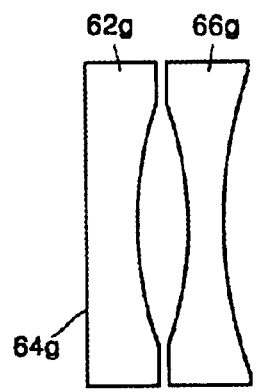

As shown in FIG. 6G, a first optical element 62g includes a flat surface toward the interferometer 31 and a concave surface in the opposite direction, and a second optical element 66g includes concave opposite surfaces facing the first optical element 62g and the aspheric surface 38, respectively. When a CGH 64g is written on the flat surface of the first optical element 62g facing the interferometer 31, the minimum grating space of the CGH 64g is increased to a maximum of 15 microns.

From the simulations illustrated in FIGS. 6A through 6G, it is apparent that the grating space of the CGH increases with an increasing number of concave surfaces in the first and second optical elements 32, 36.

Figure 7:
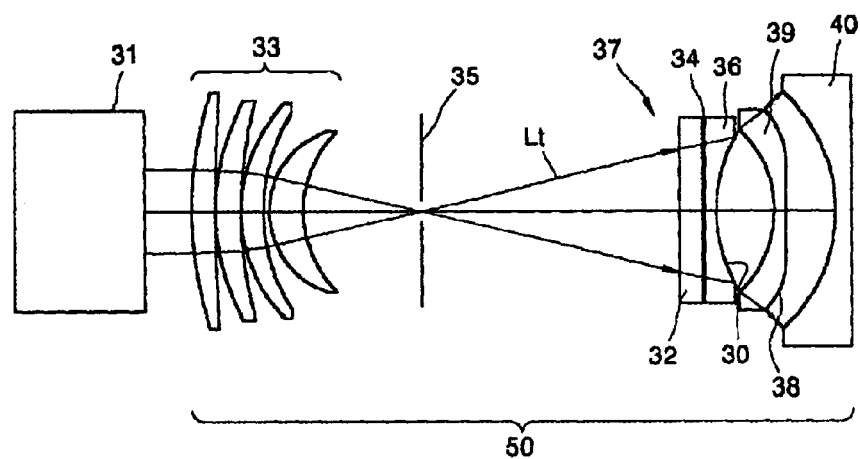
FIG. 7 shows a further embodiment of the aspheric surface measuring apparatus according to the present invention.

Another embodiment of the apparatus for measuring aspheric surfaces according to the present invention is shown in FIG. 7. The optical system of the aspheric surface measuring apparatus shown in FIG. 7 is identical to the aspheric surface measuring surface illustrated in FIG. 3A, except that the condensing lens 33 is implemented as a diverging lens 33, and a spherical mirror is further arranged after the test piece 39 having the aspheric surface 38.

Where the spherical mirror 40 is not arranged, incident light enters in a direction perpendicular to the aspheric surface 38, is reflected from the aspheric surface 38 to become the test light Lt, and proceeds toward the interferometer 31 along the same optical path along which the light is incident to the aspheric surface 38. When the spherical mirror 40 is arranged, as shown in FIG. 7, the incident light is transmitted through the aspheric surface 38, enters in a direction perpendicular to the surface of the spherical mirror 40, is reflected from the spherical mirror 40 to become the test light Lt, is transmitted through the test piece 39 having the aspheric surface 38 and then through the hologram 34, and proceeds toward the interferometer 31. The incident light and the test light Lt travel along a common optical path.

Especially, when the aspheric surface 38 is convex, it is preferable to incorporate the spherical mirror 40 into the aspheric surface measuring apparatus so as to induce a transmission wavefront (TRW).

In the aspheric surface measuring apparatus shown in FIG. 7, when the test piece 39 has an anti-reflection coating and the aspheric surface 38 is convex, the amount of light reaching the interferometer 31 is greatly different between the two cases of using the spherical mirror 40 and not using the spherical mirror 40, respectively. In particular, when no spherical mirror 40 is used, the amount of light reaching the interferometer 31 is equal to the product of the amount (0.98) of light passing through the concave surface 30, the amount (0.02) of light reflecting off the convex aspheric surface 38, and the amount (0.98) of light passing through the concave surface 30 after the reflection. When the spherical mirror 40 is used, the amount of light reaching the interferometer 31 is equal to the product of the amount (0.98) of light passing the concave surface 30, the amount (0.98) of light passing the convex aspheric surface 38, the amount (0.99) of light reflecting off the spherical mirror 40, and the amount (0.98) of light passing the convex aspheric surface 38 after the reflection, and the amount (0.98) of light passing the concave surface 30. As is apparent, the use of the spherical mirror 40 greatly increases the amount of light reaching the interferometer 31. The greater amount of light reaching the interferometer 51 enhances contrast and better shows the null interference fringes.

Similar results to the above light amount measurement are obtained when the test piece 39 has no anti-reflection coating.

Another function of the spherical mirror 40 is to reduce an incident angle of light with respect to the hologram 34. Compared with the case where light reflected from the aspheric surface 38 of the test piece 39 is used as the test light Lt, the use of the spherical mirror 40 enables a grating with a large space to be formed on the first optical element 32 as a CGH. Accordingly, the CGH with a large space can be easily formed.

Figure 8:
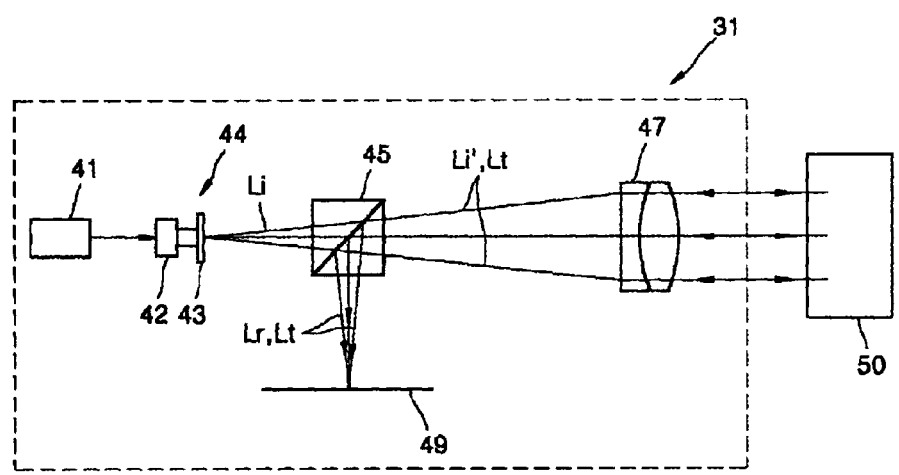
FIG. 8 shows a Fizeau interferometer used in an embodiment of the aspheric surface measuring apparatus according to the present invention.
Figure 9:
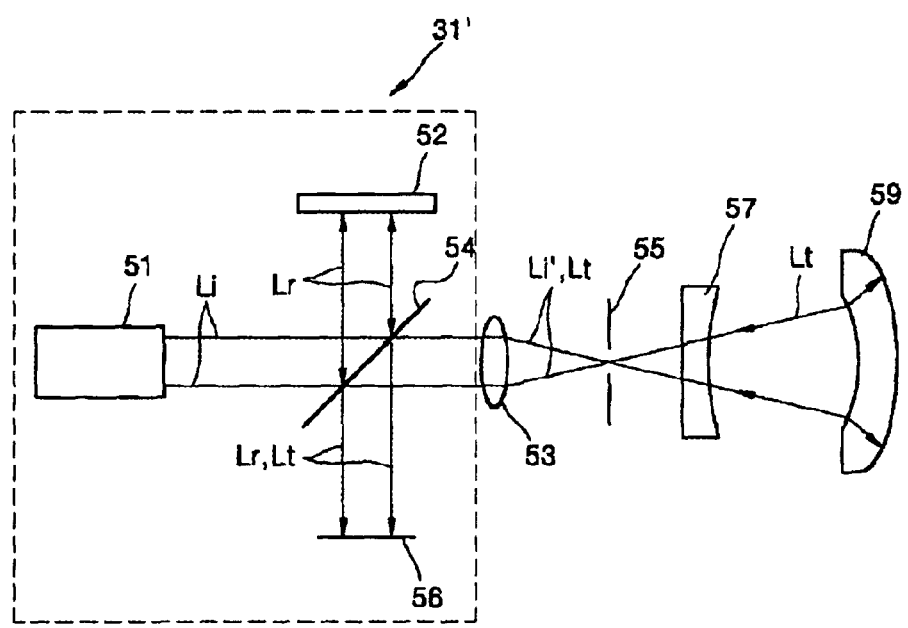
FIG. 9 shows a Twymann-Green interferometer used in an embodiment of the aspheric surface measuring apparatus according to the present invention.

In the above embodiments, a Fizeau interferometer shown in FIG. 8 or a Twymann-Green interferometer shown in FIG. 9 is used to generate the test light Lt, reference light Lr, and interference fringes. Referring to FIG. 8, the Fizeau interferometer 31 includes a light source 41, a condensing lens 42 which condenses light emitted from the light source 41, a filter 43 which diffracts light and transmits particular orders of diffracted light, and an imaging plane 49 where interference images of the reference light Lr and the test light Lt are formed. An optical path changer 45 splits the incident light Li. A portion of the split incident light Li becomes the reference light Lr and proceeds toward the imaging plane 49. Another portion of the split incident light Li proceeds towards an aspheric surface measuring unit 50 as the incident light Li'. A collimating lens 47 collimates the incident light Li'. The optical path changer 45 may be implemented using a beam splitter.

The light source 41 emits a laser beam as the incident light Li, wherein a portion of the laser beam proceeds toward the aspheric surface measuring unit 50 as the incident light Li', and the other portion of the laser beam proceeds as the reference light Lr. The condensing lens 42 condenses the laser beam (i.e., the incident light Li) emitted from the light source 41 toward the optical path changer 45. The filter 43 disposed on an optical path between the condensing lens 42 and the optical path changer 45 transmits only light of a particular wavelength range with an optimal intensity. The optical path changer 45 alters an optical path of a portion of the incident light Li by 90% toward the imaging plane 49 so as to become the reference light Lr and transmits the other portion of the incident light Li toward the aspheric surface measuring unit 50 as the incident light Li'. The collimating lens 47 collimates the incident light Li' received from the optical path changer 45.

A diverging lens may be further disposed after the collimating lens 47 to converge the incident light Li' collimated by the collimating lens 47. According to this embodiment, the diverging lens provides a similar function as the condensing lens 33 in the aspheric surface measuring apparatus of FIG. 3.

The incident light Li' passed through the Fizeau interferometer 31 proceeds toward the aspheric surface measuring unit 50. The incident light Li' is transmitted through the optical member 37, is reflected from the aspheric surface 30 to become the test light Lt, and returns to the Fizeau interferometer 31. As the test light Lt is incident on the Fizeau interferometer 31, the optical path changer 45 alters the optical path of the test light Lt by 90° so as to proceed towards the imaging plane 49. The test light Lt interferes with the reference light Lr to form interference fringes on the imaging plane 49.

FIG. 9 shows an aspheric surface measuring apparatus with a Twymann-Green interferometer according to another embodiment of the present invention. Referring to FIG. 9, a Twymann-Green interferometer 31' includes a light source 51. A reference mirror 52 includes a surface which reflects a portion of the incident light Li that is split to become the reference light Lr so as to proceed along a different optical path from the incident light Li. An imaging plane 56 is included on which interference images of the reference light Lr and the test light Lt are formed. An optical path changer 54 splits the incident light Li from the light source 51 into the reference light Lr and the incident light Li', transmits the reference light Lr reflected from the reference mirror 52 toward the imaging plane 56, and transmits the incident light Li' toward the aspheric surface measuring unit 50. The optical path changer 54 may be implemented with a beam splitter.

In the Twymann-Green interferometer 31' of FIG. 9, the light source 51 and the optical path changer 54 are the same as those in the Fizeau interferometer 31 described with reference to FIG. 8. A difference in the configuration of the Twymann-Green interferometer 31' and the Fizeau interferometer 31 is the optical path of the reference light Lr. As shown in FIG. 9, in the Twymann-Green Interferometer 31', the reference light Lr is reflected by the optical path changer 54 toward the reference mirror 52 and is reflected from the surface of the reference mirror 52 to proceed through the optical path changer 54 toward the imaging plane 56 along the same optical path as the test light Lt from the test piece 39. However, in the Fizeau interferometer 31 shown in FIG. 8, the reference light Lr is split by the optical path changer 54 directly toward the imaging plane 49.

When an aspheric surface measuring apparatus includes the first optical element 32 with the hologram 34 and the second optical element 36 with the concave surface 30, as shown in FIG. 3A, a method of measuring aspheric surfaces according to an embodiment of the present invention involves splitting the incident light Li emitted from the light source 41 (see FIG. 8) into the incident light Li' and the reference light Lr using the optical path changer 45, passing the incident light Li' to the first optical element 32 with the hologram 34 to diffract the incident light Li', transmitting the diffracted incident light Li' diffracted by the hologram 34 through the concave surface of the second optical element 36, reflecting the incident light Li after having passed through the concave surface 38 from the test piece 39 having the aspheric surface 38 to become the test light Lt, and measuring an error in the aspheric surface 38 from interference fringes of the test light Lt and the reference light Lr on the imaging plane 49.

When an aspheric surface measuring apparatus includes the optical element 67 having the hologram 64 and the concave surface 60 together on a common body, as shown in FIG. 3B, a method of measuring aspheric surfaces according to a further embodiment of the present invention involves splitting the incident light Li emitted from the light source 41 (see FIG. 8) into the incident light Li' and the reference light Lr using the optical path changer 45, transmitting the incident light Li' through the optical element 67 having the hologram 34 and the concave surface 30; and reflecting the incident light Li' after having passed through the optical element 67 from the test piece 39 having the aspheric surface 38 to become the test light Lt, and measuring an error in the aspheric surface 38 from interference fringes of the test light Lt and the reference light Lr on the imaging plane 49.

In the above-described embodiments of the aspheric surface measuring method according to the present invention, the holograms 34 and 64 are constructed to provide a common optical path for the incident light Li and the test light Lt, and are preferably formed as CGHs.

Alternatively, when the spherical mirror 40 is further arranged after the test piece 39 in the aspheric surface measuring apparatus as shown in FIG. 7, the test light Lt transmitted through the test piece 39 is reflected from the surface of the spherical mirror 40, enters in a direction perpendicular to the aspheric surface 38 of the test piece 39, and is transmitted through the test piece 39 and the hologram 34 along the same optical path as the incident light Li' to form a transmission wavefront (TRW). The use of the spherical mirror 40 is generally preferred when the aspheric surface 38 of the test piece 39 is convex.

It is preferable that, on an optical path between the light source 41 and the first optical element 32 or the optical element 67, the optical path changer 45 or 54 is disposed to divert the incident light Li' and the reference light Lr.

In the above embodiments of the aspheric surface measuring method according to the present invention, an error in the aspheric surface 38 is measured from a deviation of interference fringes of the test light Lt and the reference light Lr with respect to a reference null fringe.

Figure 10A:
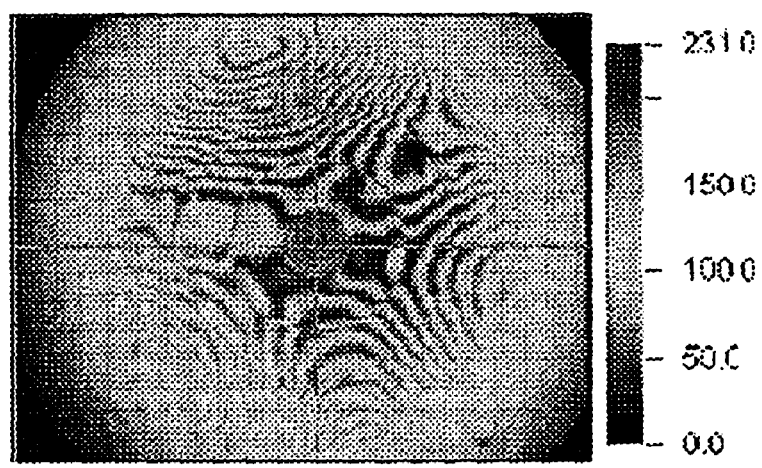
FIG. 10A shows an interferogram of null fringes for a concave aspheric surface tested by the aspheric surface measuring method of the present invention.
Figure 10B:
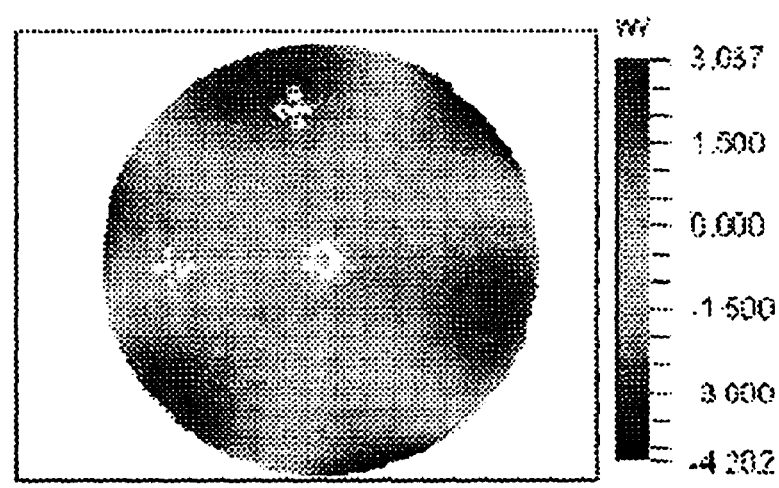
FIGS. 10B and 10C are 2-dimensional and 3-dimensonal phase maps, respectively, of a concave aspheric surface tested by the aspheric surface measuring method of the present invention.
Figure 10C:
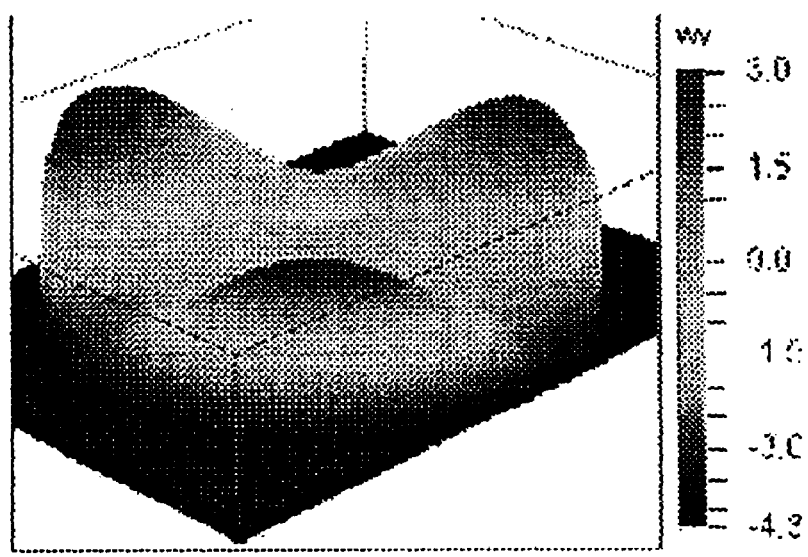

FIGS. 10A through 10C show interferograms of concave aspheric surfaces obtained by using the embodiment of the aspheric surface measuring apparatus shown in FIG. 3A. FIG. 10A shows null fringes resulting from a concave aspheric surface 38. FIGS. 10B and 10C are 2-dimensional and 3-dimensional phase maps, respectively, for a concave aspheric surface 38 of a test piece 39. When a newly manufactured aspheric lens is tested using the aspheric surface measuring apparatus, the null fringes in the interferogram, as shown in FIG. 10A, indicate that the aspheric lens 39 tested is a precision, perfect lens. A phase map of the null fringes is nearly planar and has a zero value.

However, for an imperfectly processed aspheric lens 39, phase maps, as shown in FIGS. 10B and 10C, result. Referring to FIGS. 10B and 10C, a gray region in FIG. 10B corresponds to peaks in FIG. 10C, and a dark region in FIG. 10B corresponds to valleys in FIG. 10C. In the phase maps of FIGS. 10B and 10C, the aspheric lens 39 has about 7 waves of peak-to-valley errors. Accordingly, by further processing the aspheric surface 38 such as to eliminate the 7 waves, a precision aspheric surface 38 can be obtained.

Figure 11A:
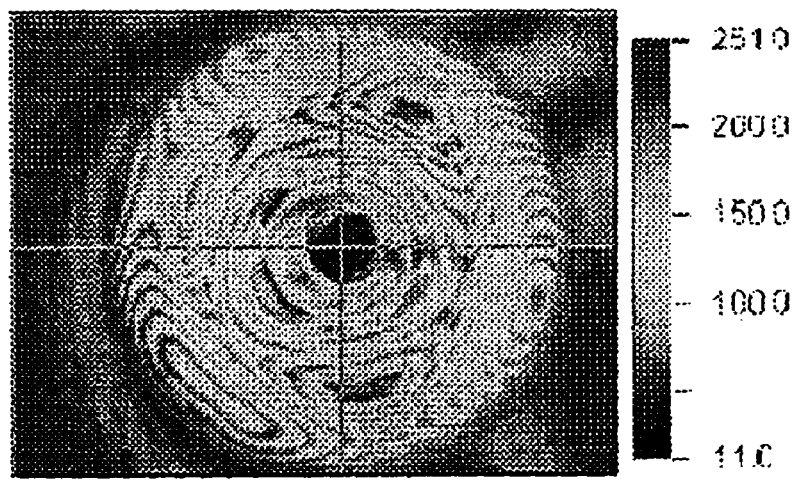
FIG. 11A shows an interferogram of null fringes for a convex aspheric surface tested by the aspheric surface measuring method according to the present invention.
Figure 11B:
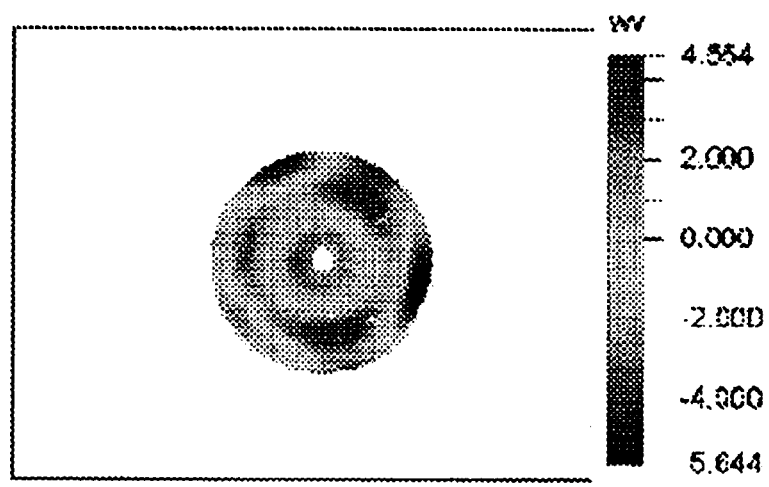
FIG. 11B is a 2-dimensional phase map of a transmission wavefront for the convex aspheric surface tested by the aspheric surface measuring method according to the present invention.

FIGS. 11A and 11B show interferograms of the test light and the reference light for a convex aspheric surface 38 when tested using the aspheric surface measuring apparatus and method shown in FIG. 3B. As shown in FIG. 3B, the incident light Li' is diffracted by the hologram 64 and transmitted through the concave surface 60 of the optical member 67 is reflected from the convex aspheric surface 38 as the test light Lt and is used to image an interference wavefront with the reference light Lr. FIGS. 11A and 11B are a null fringe interferogram and a 2-dimensional phase map, respectively, of the transmission wavefront (TRW) obtained by using the aspheric surface measuring apparatus using a Fizeau interferometer and a planar-concave lens.

The TRW is expressed as equation 3 below:

$$TRW = -2S_1(n-1) - 2S_2(n-1) \quad (3)$$

Figure 13:
FIG. 13 shows a concave surface of an optical element with two reference lines marked for accuracy in the aspheric surface measuring method according to the present invention.

In equation 3, $S_1$ denotes a figure error of the concave surface of the optical element, $S_2$ denotes a figure error of the convex aspheric surface 38 of a test piece 39, and n is a refractive index of the test piece 39. When equation 3 above is transformed for $S_2$, equation 1 above is obtained, and the figure error of the convex aspheric surface $S_2$ can be calculated using equation 1. For phase mapping as expressed in equation 1 above, where the TRW is subtracted from the figure error of the concave surface $S_1$, two reference dots are marked on the concave surface, as shown in FIG. 13, to fix the zooming position of the interferometer for every measurement.

Figure 12A:
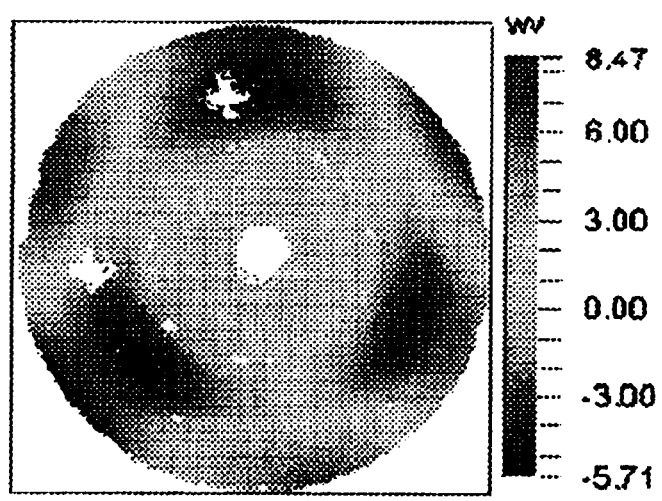
FIGS. 12A and 12B are 2-dimensional and 3-dimensional phase maps, respectively, obtained using equation 3 when a convex aspheric surface is tested by the aspheric surface measuring method of the present invention.
Figure 12B:
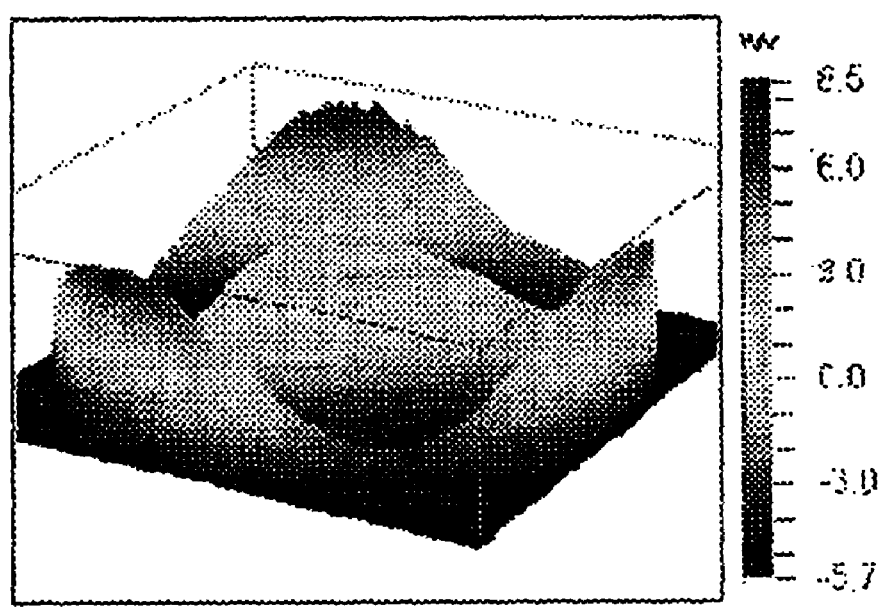

FIGS. 12A and 12B show 2-dimensional and 3-dimensional phase maps, respectively, obtained using equation 3 above. As shown in FIGS. 12A and 12B, the convex aspheric surface 38 of the test piece 39 has 2.9 waves of root-mean-square (RMS) figure errors and 14.1 waves of peak-to-valley surface figure errors.

An apparatus for measuring an aspheric surface according to the present invention uses an optical member with a concave surface to reduce an incident angle of light to increase the grating space of the hologram. Accordingly, a hologram with an increased grating space can be easily manufactured.

In the apparatus and method of measuring aspheric surfaces according to the present invention, the surface of an extremely aspheric test piece can be precisely measured by using an optical member with such a hologram and a concave surface.

In the apparatus for and method of measuring aspheric surfaces according to the present invention, only test light is transmitted through the hologram and concave surface of the optical member, and therefore, a concave optical member with slightly poor precision can be used. Accordingly, since there is no need to perfectly match the optical paths for the test light and reference light, a Twymann-Green interferometer as well as a Fizeau interferometer can be used. In addition, a chrome-on-glass type CGH and a phase type CGH can be used as the hologram.

For example, it will be understood by those skilled in the art that any optical element with a concave surface and different types of holograms can be combined to construct an aspheric surface measuring apparatus according to the present invention. Therefore, the spirit and scope of the present invention should be defined by the accompanying claims, rather than by the descriptions in the embodiments.

As described above, an advantage of the aspheric surface measuring apparatus and method according to the present invention lies in that a lens with a great asphericity can be precisely measured by using a concave optical element and a hologram with a small incident angle and a large grating space. A variety of interferometers and CGHs, and a concave optical element with slightly poor surface precision can be applied, thereby lowering the manufacturing cost of the aspheric surface measuring apparatus.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for measuring an aspheric surface, comprising:

an interferometer which generates incident light and which measures an error in the aspheric surface using a test light and the incident light;

a test piece having the aspheric surface which receives the incident light along an optical path and from which the incident light is reflected as the test light;

a first optical element disposed on the optical path of the incident light and having one surface with a hologram to diffract the incident light toward the test piece; and a second optical element disposed along the optical path after the first optical element which transmits the diffracted incident light toward the aspheric surface and has a concave surface that reduces an incident angle of the test light incident to the hologram from the aspheric surface.

2. The apparatus of claim 1, wherein the first optical element further comprises a concave surface.

3. The apparatus of claim 1, wherein the second optical element further comprises a surface with a hologram.

4. The apparatus of claim 1, wherein the incident light is reflected to become the test light after having been incident in a direction perpendicular to the aspheric surface of the test piece, and the test light proceeds from the test piece along a same optical path as the optical path of the incident light.

5. The apparatus of claim 1, further comprising a spherical mirror disposed after the test piece and which reflects the incident light having been transmitted through the test piece.

6. The apparatus of claim 1, wherein the hologram is a computer-generated hologram (CGH).

7. A method of measuring an aspheric surface, comprising:

splitting light emitted from a light source into incident light and reference light using an optical path changer;

passing the incident light to a first optical element with a hologram which diffracts the incident light;

transmitting the diffracted incident light through a second optical element having a concave surface;

reflecting the incident light after having passed through the concave surface from a test piece with the aspheric surface to form test light; and measuring an error in the aspheric surface using interference fringes of the test light and the reference light.

8. The method of claim 7, wherein in the reflecting the incident light, the incident light is incident in a direction perpendicular to the aspheric surface of the test piece, and the test light reflected from the aspheric surface proceeds through the first and second optical elements along a same optical path as an optical path of the incident light.

9. The method of claim 7, wherein in the reflecting the incident light, the incident light is transmitted through the test piece, is incident in a direction perpendicular to a spherical mirror disposed after the test piece, is reflected from the spherical mirror to become the test light, and the test light reflected from the spherical mirror proceeds through the first and second optical elements along a same optical path as an optical path of the incident light.

10. The method of claim 7, wherein in the measuring an error, the error in the aspheric surface is measured from a deviation of the interference fringes of the test light and the reference light with respect to a null interference fringe.

11. The method of claim 9, wherein in the measuring an error, the error in the aspheric surface is measured from a deviation of the interference fringes of the test light and the reference light with respect to a null interference fringe.

12. The method of claim 7, wherein the hologram is a computer-generated hologram (CGH).

13. The method of claim 10, wherein:

when the test piece has a convex aspheric surface, an error in the convex aspheric surface is calculated using the following equation:

$$S_2 = \frac{1}{2(n-1)}(2S_1(n-1) - TRW),$$

$S_1$ denotes an error in the concave surface of the second optical element, $S_2$ denotes the error in the convex aspheric surface of the test piece, n is a refractive index of the test piece, and TRW denotes a transmission wavefront.

14. The method of claim 11, wherein:

when the test piece has a convex aspheric surface, an error in the convex aspheric surface is calculated using the following equation:

$$S_2 = \frac{1}{2(n-1)}(2S_1(n-1) - TRW),$$

$S_1$ denotes an error in the concave surface of the second optical element, $S_2$ denotes the error in the convex aspheric surface of the test piece, n is a refractive index of the test piece, and TRW denotes a transmission wavefront.

15. An apparatus for measuring an aspheric surface, comprising:

an interferometer which generates incident light and which measures an error in the aspheric surface using a test light and the incident light;

a test piece having the aspheric surface which receives the incident light along an optical path and from which the incident light is reflected to become the test light;

an optical element disposed in the optical path of the incident light, the optical element having a hologram to diffract the incident light towards the test piece and a concave surface to reduce an incident angle of the test light incident to the hologram.

16. The apparatus of claim 15, wherein the incident light is reflected to become the test light after being incident in a direction perpendicular to the aspheric surface of the test piece, and the test light proceeds along a same optical path as the optical path of the incident light.

17. The apparatus of claim 15, further comprising a spherical mirror disposed after the test piece and which reflects the incident light having passed through the test piece.

18. The apparatus of claim 15, wherein the optical element further comprises a hologram on the concave surface.

19. The apparatus of claim 15, wherein the hologram is a computer-generated hologram (CGH).

20. A method of measuring an aspheric surface, comprising:

splitting light emitted from a light source into incident light and reference light using an optical path changer;

transmitting the incident light through an optical element having a hologram and a concave surface;

reflecting the incident light after having passed through the optical element from a test piece with the aspheric surface to become test light; and measuring an error in the aspheric surface from interference fringes of the test light and the reference light.

21. The method of claim 20, wherein in the reflecting the incident light, the incident light is incident in a direction perpendicular to the aspheric surface of the test piece, and the test light reflected from the aspheric surface proceeds through the optical element along a same optical path as an optical path of the incident light.

22. The method of claim 20, wherein in the reflecting the incident light, the incident light is transmitted through the test piece, is incident in a direction perpendicular to a spherical mirror disposed after the test piece, is reflected from the spherical mirror as the test light, and the test light reflected from the spherical mirror proceeds through the optical element along a same optical path as an optical path of the incident light.

23. The method of claim 20, wherein in the measuring an error, the error in the aspheric surface is measured from a deviation of the interference fringes of the test light and the reference light with respect to a null interference fringe.

24. The method of claim 22, wherein in the measuring an error, the error in the aspheric surface is measured from a deviation of the interference fringes of the test light and the reference light with respect to a null interference fringe.

25. The method of claim 20, wherein the hologram is a computer-generated hologram (CGH).

26. The method of claim 23, wherein:

when the test piece has a convex aspheric surface, an error in the convex aspheric surface is calculated using the following equation:

$$S_2 = \frac{1}{2(n-1)}(2S_1(n-1) - TRW),$$

$S_1$ denotes an error in the concave surface of the optical element, $S_2$ denotes the error in the convex aspheric surface of the test piece, n is a refractive index of the test piece, and TRW denotes a transmission wavefront.

27. The method of claim 24, wherein:

when the test piece has a convex aspheric surface, an error in the convex aspheric surface is calculated using the following equation:

$$S_2 = \frac{1}{2(n-1)}[2S_1(n-1) - TRW],$$

$S_1$ denotes an error in the concave surface of the optical element, $S_2$ denotes the error in the convex aspheric surface of the test piece, n is a refractive index of the test piece, and TRW denotes a transmission wavefront.

28. An apparatus for measuring an aspheric surface on a test piece, comprising:

an interferometer which generates a first light to proceed along an optical path to the test piece to be reflected from the aspheric surface to become test light, and which evaluates the test light and the first light to measure an error on the aspheric surface;

a holographic surface disposed in the optical path of the first light to diffract the incident first light towards the test piece; and an optical surface disposed between the test piece and the holographic surface and having a shape to reduce an incident angle of the test light incident to the holographic surface.

29. The apparatus of claim 28, wherein:

the holographic surface and the optical surface are disposed on sides of an optical element made from a material, and the optical path proceeds through a continuous band of the material between the holographic surface and the optical surface without proceeding through a different material.

30. The apparatus of claim 28, wherein the optical surface comprises a concave surface facing the aspheric surface.

31. The apparatus of claim 28, wherein the optical surface comprises a concave surface facing away from the aspheric surface.

32. The apparatus of claim 29, wherein the optical surface comprises a concave surface facing the aspheric surface.

33. The apparatus of claim 28, further comprising a second optical surface disposed along the optical path between the optical element and the test piece and which has a shape that further reduces the incident angle of the test light on the holographic surface.

34. The apparatus of claim 33, further comprising a third optical surface disposed along the optical path between the second optical surface and the test piece and which has a shape which additionally reduces the incident angle of the test light on the holographic surface.

35. The apparatus of claim 33, wherein the optical surface and the second optical surface comprise concave surfaces facing the aspheric surface.

36. The apparatus of claim 33, wherein the optical surface comprises a concave surface which faces a concave surface of the second optical surface.

37. The apparatus of claim 36, further comprising a third optical surface disposed along the optical path between the second optical surface and the test piece and which has a concave surface which additionally reduces the incident angle of the test light on the holographic surface, wherein the concave surface of the third optical surface faces the aspheric surface.

38. The apparatus of claim 37, wherein the holographic surface and the optical surface are disposed on sides of a first optical element made from a first material, the optical path proceeds through a continuous band of the first material between the holographic surface and the optical surface without proceeding through a different material, the second and third optical surfaces are disposed on sides of a second optical element made from a second material, and the optical path proceeds through a continuous band of the second material between the second and third optical surfaces without proceeding through a different material.

39. The apparatus of claim 28, wherein the interferometer comprises:

a light unit which generates light, an optical path changing unit which separates the generated light into the first light and a reference light, which directs the first light along the optical path, which receives the test light along the optical path, and which directs the reference light and the received test light to form interference fringes onto an image plane, and a measuring device which compares the interference fringes on the image plane to evaluate the error in the aspheric surface.

40. A method of correcting an aspheric surface, comprising:

splitting light emitted from a light source into a first light and a reference light;

transmitting the first light through a holographic surface and a concave surface;

receiving the first light at the aspheric surface after passing through the holographic and surfaces;

reflecting the received first light from a test piece with the aspheric surface to become test light;

measuring an error in the aspheric surface from interference fringes of the test light and the reference light; and if an error is detected, additionally processing the aspheric surface to correct the measured error.

41. The method of claim 40, further comprising transmitting the first light through additional concave surfaces between the holographic surface and the aspheric surface, wherein the concave surface and the additional concave surfaces are shaped to reduce an incident angle of the test light on the holographic surface.

* * * * *